US008392750B2

(12) United States Patent
Kaul (10) Patent No.: US 8,392,750 B2
(45) Date of Patent: Mar. 5, 2013

(54) METHOD AND APPARATUS FOR CRASH RECOVERY AND RESYNCHRONIZATION

(75) Inventor: Anupam Kaul, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 477 days.

(21) Appl. No.: 12/706,537

(22) Filed: Feb. 16, 2010

(65) Prior Publication Data
US 2011/0201327 A1    Aug. 18, 2011

(51) Int. Cl.
*G06F 11/00* (2006.01)
(52) U.S. Cl. ............... 714/4.21; 714/15; 714/20
(58) Field of Classification Search ............ 714/4.21, 714/15, 20, 38.1
See application file for complete search history.

(56) References Cited

U.S. PATENT DOCUMENTS

| 7,054,955 | B2* | 5/2006 | Chen et al. ............. 709/248 |
| 7,356,727 | B1  | 4/2008 | McGhee et al. |
| 7,669,182 | B2* | 2/2010 | Garcia ................ 717/108 |
| 2003/0236826 | A1  | 12/2003 | Islam et al. |
| 2004/0153857 | A1* | 8/2004 | Yamazaki et al. ........ 714/43 |
| 2005/0246582 | A1  | 11/2005 | Nash et al. |
| 2008/0168183 | A1* | 7/2008 | Marcy et al. .......... 709/248 |
| 2009/0150569 | A1* | 6/2009 | Kumar et al. ........... 709/248 |
| 2009/0240985 | A1  | 9/2009 | Baranowsky |

* cited by examiner

*Primary Examiner* — Joseph D Manoskey (57) ABSTRACT

Techniques to manage recovery and resynchronization of components or modules in a mobile computing device are described. For example, a mobile computing device may comprise a processor and a plurality of hierarchical or peer related modules. The plurality of modules may include resynchronization logic operative to resynchronize a module after a crash using a neighboring hierarchical or peer related module. Other embodiments are described and claimed.

27 Claims, 6 Drawing Sheets

METHOD AND APPARATUS FOR CRASH RECOVERY AND RESYNCHRONIZATION

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth. In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Providing such an array of functionality provides users with a variety of options and expectations when performing wireless communications tasks. When communicating, it is advantageous to preserve a wireless communication connection despite the failure of critical system components. As a result, it is desirable to enhance the recovery and resynchronization capabilities for components of a mobile computing device. For example, it may be advantageous to automatically and/or dynamically recover and resynchronize components after a crash to maintain a wireless connection. Consequently, there exists a substantial need for techniques to improve the recovery and resynchronization of components or modules of a mobile computing device.

DETAILED DESCRIPTION

Various embodiments may be generally directed to recovery and resynchronization techniques for components or modules of a mobile computing device, such as a smart phone. Some embodiments may be particularly directed to dynamic recovery and resynchronization techniques for components or modules of a mobile computing device using neighboring hierarchical or peer related components or modules to preserve a wireless data connection for the mobile computing device despite the crash or failure of one or more components or modules. In various embodiments, crash or failure, as described throughout, may comprise a component or module entering a non-operative state.

In one embodiment, for example, a mobile computing device may include a plurality of hierarchical or peer related modules or components. In various embodiments, the plurality of hierarchical or peer related modules or components may include resynchronization logic operative to resynchronize a module after a crash using a neighboring hierarchical or peer related module. Other embodiments are described and claimed.

Modern mobile computing devices often rely heavily on wireless data connections to perform a variety of essential functions. Additionally, a user's perception of the quality and reliability of a mobile computing device may be based, in part, on the performance of these wireless connections. For example, visible aspects include, ongoing voice in a call, a counter incrementing in an active call, the assurance of seeing the operator name on a corner of the screen, the ability to continue downloading content on the web, getting satellite data on a GPS map, etc. Various embodiments described herein attempt to preserve these perceptions, even if critical services that provide these services in some hierarchical level, crash and restart. In many modern computing systems, the crash or failure of any component related to or involved in a wireless data connection, including voice, data, GPS, etc., for example, may result in the loss or drop of the entire wireless data connections, even if, for example, the radio firmware has not actually crashed. This is often caused because these systems are either monolithically designed, or are not multi-process systems. In these types of systems, crashes anywhere in hierarchy of components or module may result in a panic, crash or failure being propagated all the way to the radio firmware and the subsequent recovery may cause the wireless data connections to crash or otherwise fail. It may be desirable, therefore, to implement a system or protocol that helps to preserve wireless data connections despite critical system component or daemon failure. For example, maintaining a wireless connection when a Host Telephony Interface Layer stack (TIL) or a data wide area network (WAN) stack crashes or resets during active wireless data communication sessions may be desirable.

Implementing the concept of continuously replenishing a crashed entity with sufficient information to recover at runtime with assistance from immediate peers or neighbors, which forms the basis of such a protocol may help to not only preserve wireless data connections, but may also help to preserve a user's notion that a crash did not take place on the device, especially if user interface (UI) components are also able to recover using the protocol. This may result in an enhanced user experience as there is no loss of wireless data connections of the mobile computing device and there may also be a minimal or no visible perception of a crash having taken place to the user, depending on the hierarchical level of the host software that has crashed.

In various embodiments, the protocol to implement such features may comprise a runtime crash recovery and resynchronization protocol for hierarchical modules or components of a mobile computing device, such as a webOS™ device from Palm®. In some embodiments, the protocol may be implemented to resynchronize a crashed service or component at runtime, with respect to its immediate service provider components, its peer components and/or its parent components, without causing other layers or other components in the hierarchy to lose current states or to go into default modes and therein, to maintain a wireless data connection despite the crashed service or component. In various embodiments, the crash recovery and resynchronization method or protocol may be referred to herein as Help Me Sync To You (HEMSTY).

In various embodiments, HEMSTY may help to preserve wireless data connections despite a component or module failure or crash. In some embodiments, HEMSTY may also help to preserve a user's perception of smooth functioning of the mobile computing device, as well as the notion of responsiveness of the mobile computing device, despite a critical crash having taken place somewhere on the mobile computing device.

HEMSTY may be different than previously proposed recovery methods. For example, when a service, component, process or a daemon in a hierarchy crashes and recovers in a HEMSTY system, the component does not request its dependent systems to go to a default mode or to reset. Instead, the HEMSTY system component may request its immediate sources of information in the system hierarchy (e.g. neighboring hierarchical or peer related modules or components) on which it depends to help it to quickly resynchronize to whatever current information those components have with respect to the crashed entity, thus making the crashed component go from an "initial" state right after the recovery to a "current" state with respect to those components that replenish it with current state information. And those neighbors, if they crash, in turn will request their immediate neighbors for synchronization information first. In some embodiments, this process of seeing information extends through the hierarchy, and the buck stops at the radio firmware, which has the most up-to-date information from the radio channels.

In various embodiments, neighboring hierarchical or peer related components or modules may comprise layered components or modules of a software services stack. In some embodiments, the hierarchical or peer relationship may describe the interaction or interconnection of a plurality of modules to a support a common service or task. Neighboring may include next to, adjacent, sequential, contiguous, directly related or any other suitable relationship directed to modules or components that are in direct communication with each other, have a peer relationship or a parent child relationship for example. Other embodiments are described and claimed.

In various embodiments, the crashed system is quickly brought to the current state of events in the system, and is able to resume its role in the hierarchy, based on cooperation from its chief service providers. In some embodiments, regardless of the criticality of the service component, HEMSTY may help to ensure that the system stays robust by arresting any panic caused by the crash from spreading to more than immediate hierarchical neighbors, and by restricting or preventing requests to the radio firmware to put the radio into an offline mode.

Based on principles of intelligent cooperation between system modules or components, HEMSTY restricts the recovery to only the component that crashed and came back up in some embodiments. In various embodiments, for example, there is no principle of "sacrifice" in HEMSTY that requires other components to crash or fail based on the crash or failure of a related or neighboring component.

To maintain device responsiveness to user and/or network requests, HEMSTY may also be operative to recognize the concept of critical events in some embodiments. In various embodiments, critical events may originate from a network (e.g. an incoming voice call) or from a user (e.g. a disconnect request or a click, touch or other gesture or input on the device, such as using a browser application to go to a next web page). HEMSTY may be operative to handle such events even during the HEMSTY recovery procedure. HEMSTY may be operative to recognize that the most critical resource that needs to be protected is the physical channel acquisition (e.g. wireless data connection) in some embodiments. In various embodiments, as long as the wireless data connection remains intact, any other software system crash should be resynchronizable and still be able to preserve these critical wireless connection resources of the mobile computing device. Other embodiments are described and claimed.

HEMSTY may generally be applicable to software stacks on operating systems that are capable of running multiple processes or services that are connected by a software bus system, and where there is a hierarchical or peer relationship between different software components. In various embodiments, such a system may have a query based or notification mechanism over the software bus wherein the services query, update or get notified by their peer services or by their lower layer services or components about information that is vital to these services. For example, on a smart phone operating system, many services are critical for the processing of voice, data and any other wireless communication. In some embodiments, a hierarchical or peer relationship of such critical software services is formed, starting at the firmware that talks with the radio and the network up to and including the UI that the user of a smart phone is exposed to and interacts with.

Examples of critical services on smart phone or mobile computing device may comprise a Host Telephony stack, an Audio stack, a Bluetooth stack, Wifi or Wan stack, GPS services, any middle layer stack or component, any of the Java or JavaScript services, or any software component directly interacting with the UI, for example. In various embodiments, if any of these services crash while the system is running, especially critical services or daemons, the effect can be twofold: (1) a voice or data channel may be dropped or lost during the resynchronization attempts, or important events like an incoming call or SMS may be missed during the crash; and (2) a user may be acutely aware of the system malfunction, first by losing voice or data and second, by finding the system unresponsive for some time. For example, if the user wanted to disconnect an ongoing call right around the time the host telephony software crashed, this would be noticeable to the user.

Users often give a lot of importance to the way things look and feel in visually oriented systems/devices like smart phones. A crash, in some embodiments, may be a perception of a malfunction in the system. There is an intrinsic loss-of-value perception by the user when this happens. On smart phones devices implementing a HEMSTY protocol, the visual and actual indications of a crash, may be prevented. Other embodiments are described and claimed.

Various embodiments may comprise one or more elements such as modules, components and/or protocols. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "some embodiments" or "various embodiments" means that a particular feature, structure, or characteristic described in connection with the embodiment is included in at least one embodiment. The appearances of the phrase "in various embodiments" in various places in the specification are not necessarily all referring to the same embodiment.

Figure 1A:
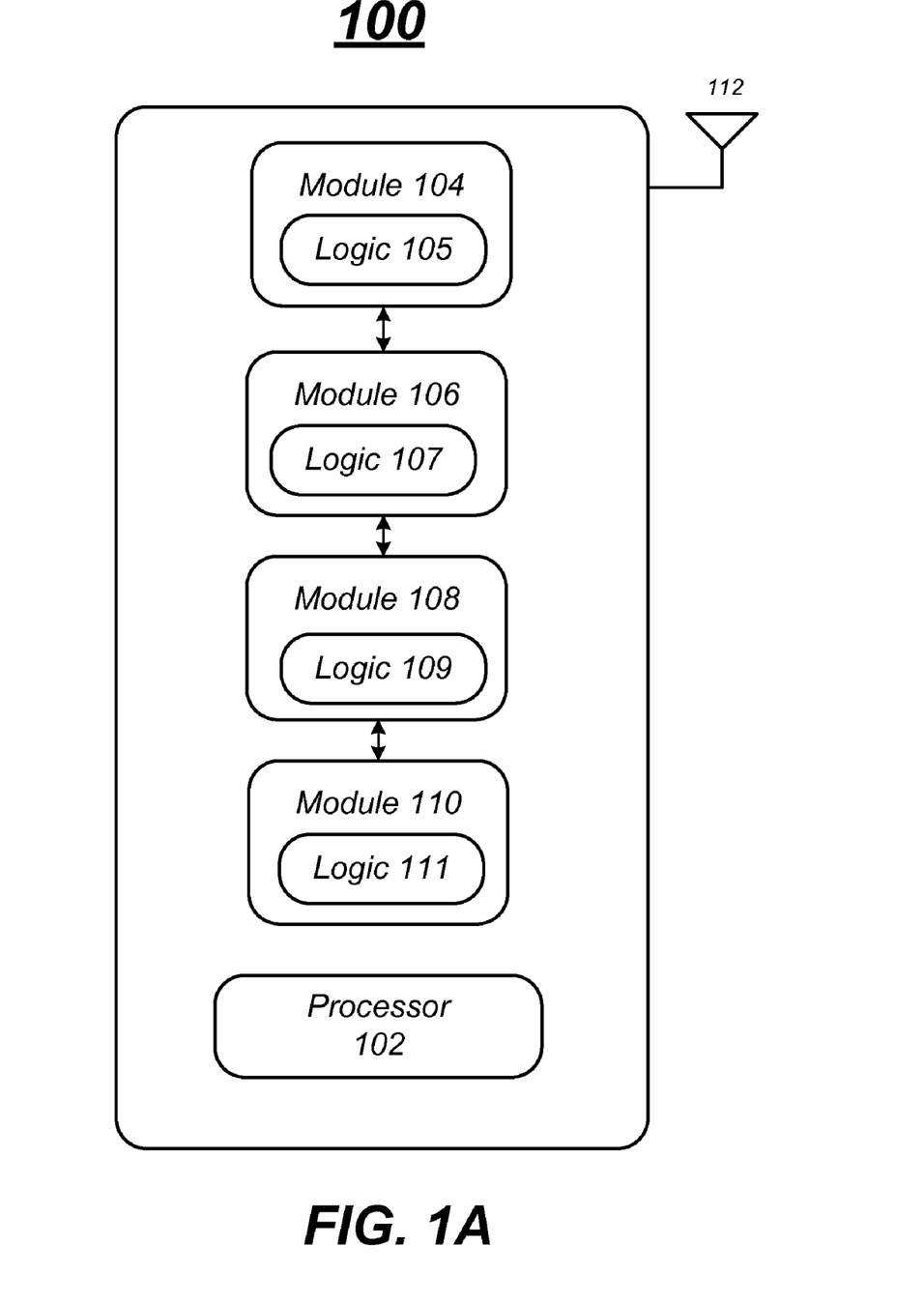
FIG. 1A illustrates one embodiment of a first mobile computing device.

FIG. 1A illustrates one embodiment of an apparatus. In particular, FIG. 1A shows a first embodiment of a mobile computing device 100. The mobile computing device 100 may include by way of example and not limitation a processor 102, modules 104, 106, 108 and 110, logic 105, 107, 109 and 111, and transceiver 112. These elements or portions of these elements may be implemented in hardware, software, firmware, or in any combination thereof. The embodiments are not limited to these depicted elements. It should be understood that a limited number of components, modules and logic are shown for purposes of illustration and not limitation. As such, any number or type of modules, logic or components may be implemented and still fall within the described embodiments.

The mobile computing device 100 may be generally configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

The mobile computing device 100 may include a processor 102 coupled to the modules and logic 104-111 in some embodiments. The processor 102 may be operative to execute the modules and/or the logic 104-111. The mobile computing device 100 may further include a memory (not shown) coupled to the processor 102. The memory may be operative to store the various modules and/or logic 104-111 in some embodiments. Other embodiments are described and claimed.

The processor 102 may comprise a general purpose processor or an application specific processor arranged to provide general or specific computing capabilities for the mobile computing device 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The mobile computing device 100 may include a memory comprising a computer-readable media such as volatile or non-volatile memory units arranged to store programs and data for execution by the processor 102 in some embodiments. In various embodiments, the processor 102 may retrieve and execute program instructions, code or data from the memory to control or provide wireless communication operations for the mobile computing device 100. The embodiments are not limited in this context.

The mobile computing device 100 may include one or more modules 104, 106, 108 and 110 arranged and/or operative to communicate information over one or more types of wireless communication links and/or to manage a wireless connection for the mobile computing device 100. Examples of a wireless communication link may include, without limitation, a radio channel, infrared channel, radio-frequency (RF) channel, WiFi channel, a portion of the RF spectrum, and/or one or more licensed or license-free frequency bands. In the latter case, the wireless nodes may include one more wireless interfaces and/or components for wireless communication, such as one or more transmitters, receivers, transmitter/receivers ("transceivers") 112, radios, chipsets, amplifiers, filters, control logic, network interface cards (NICs), antennas 112, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques. Other embodiments are described and claimed.

In various embodiments, modules 104, 106, 108 and 110 may each be configured to include or implement logic 105, 107, 109 and 111 respectively. In some embodiments, logic 105, 107, 109 and 111 may comprise resynchronization logic operative to implement a HEMSTY protocol. The modules 104, 106, 108 and 110 may comprise processes or services of a software stack on an operating system that is capable of running multiple processes or services in some embodiments. In various embodiments, the modules 104, 106, 108 and 110 may comprise a software stack coupled using a software bus, and the modules may be arranged in a hierarchical or peer related manner. Other embodiments are described and claimed.

The plurality of modules 104, 106, 108 and 110 may comprise hierarchical or peer related modules in some embodiments. For example, module 104 may communicate information with module 106, which may communicate information with module 108, which may communicate information with module 110. In various embodiments, for example, module 104 may comprise a high level layer or module of a software stack and module 110 may comprises a low level layer or module of the software stack. It should be understood than any number or hierarchical or peer related arrangement of modules could be used and still fall within the described embodiments.

In various embodiments, the plurality of modules 104, 106, 108 and 110 include resynchronization logic 105, 107, 109 and 111 operative to resynchronize a module after a crash using a neighboring hierarchical or peer related module. For example, if module 104 were to fail or crash, logic 105 may be operative to resynchronize module 104 using only module 106 and logic 107. In this example, module 106 is the only neighboring hierarchical or peer related module for module 104. If, on the other hand, module 108 were to fail or crash for example, logic 109 may resynchronize module 109 with module 106 or module 110 as both of these modules are neighboring hierarchical or peer related modules for module 108.

Modules of 104, 106, 108 and 110 may cooperate to manage a wireless data connection for mobile computing device 100 in some embodiments. In various embodiments, the wireless connection may be maintained when a module crashes and during the resynchronization of a module that has crashed. For example, if module 104 were to crash, modules 106, 108 and 110 may cooperate to maintain the wireless connection for mobile computing device 100. The wireless connection may also be maintained during the HEMSTY resynchronization procedures for module 104. Other embodiments are described and claimed.

In various embodiments, the module that has crashed may comprise a requester module and one or more neighboring hierarchical or peer related modules may comprise provider modules. In some embodiments, the requester module is operative to automatically recover from a crash and to request synchronization information from one or more neighboring hierarchical or peer related provider modules. For example, following a crash of module 106, the module may automatically recover from the crash and subsequently request resynchronization information from module 104 or module 108.

In some embodiments, each provider module may include a buffer having synchronization information for one or more requester modules. For example, each HEMSTY provider module may be operative to track the latest information for one or more potential requester modules in a buffer that it is responsible for maintaining. These information items could be derived from the HEMSTY provider module's own state machine, indirectly from its own stimuli or by monitoring the HEMSTY requester modules. The information may comprise elements, state machines, timing information service calls or any other information suitable for use in synchronizing a component or module after a crash. In some embodiments, buffer may comprise any suitable device or method for storing information. Use of the term buffer throughout is independent of the choice or complexity of data structure used and is also independent of any language of implementation, for example. In various embodiments, buffer may comprise a linked list or any other structure than an entity may use to store information. In some embodiments, the buffer may comprise a client-stimuli buffer or a critical events buffer, for example. Other embodiments are described and claimed.

In various embodiments, each HEMSTY provider module may need to track the synchronization information required by its client or a multitude of clients (e.g. potential HEMSTY requester modules). For example, the synchronization information may be obtained using an automated mechanism wherein the components or modules inform other components or modules of information that they would require in order to resynchronize after a crash, or such an arrangement and information exchange could be determined and completed at compile time for the mobile computing device 100.

Each HEMSTY provider module has the responsibility of keeping up-to-date state information for each of its potential HEMSTY requester modules in some embodiments. If a HEMSTY provider module itself should crash, it will initiate its own HEMSTY procedure with its lower layer component. In various embodiments, the HEMSTY recovery and resynchronization process stops at the radio, wherein the radio will simply restart if it crashed and will not implement a HEMSTY request.

In various embodiments, a HEMSTY provider module does not dictate the course of a HEMSTY procedure. For example, in some embodiments, this is the responsibility of the HEMSTY requester module. Other embodiments are described and claimed.

In various embodiments, the buffer at each HEMSTY provider module containing synchronization information for potential HEMSTY requester modules may be part of or separate from the resynchronization logic. In some embodiments, the buffer may not be an actual memory copy of the information. Rather, it may simply point to the latest information that is available in the actual state machine, if pointers are available in the language of implementation of the HEMSTY provider, for example.

The synchronization information may comprise one or more information elements comprising a recent state of a requester module as monitored by one or more provider modules in some embodiments. For this to function correctly in a HEMSTY system, a HEMSTY requester module needs to be aware of its HEMSTY provider module(s). Likewise, a HEMSTY provider module needs to be aware of its HEMSTY requester module(s). In various embodiments, each resynchronization request may include identification information for a HEMSTY requester module.

In various embodiments, to avoid duplication of some common elements, a HEMSTY provider module may form links wherever required (e.g. using pointers, for example) so that there is only one real copy of the actual information even if there are multiple client stimuli buffers. In some HEMSTY systems, information that a potential HEMSTY requester module needs may not be duplicated among different HEMSTY provider modules. Each HEMSTY provider module may have different information that a HEMSTY client may require, for example.

Each HEMSTY provider module may be operative to provide the synchronization information to a requester module in response to a request from the requester module in some embodiments. In response, the requester module receives the synchronization information from the provider module and resynchronizes to the provider module using the synchronization information. Other embodiments are described and claimed.

HEMSTY assumes that a process once crashed, will be able to restart, through whatever mechanism is chosen by the mobile computing device 100. Furthermore, in some embodiments, when a system that talks over a software bus crashes, its hierarchical neighbors may be aware of a link being broken, which may be specific to the particular means of communication between the modules. Similarly, when a component or module joins a software bus, or re-establishes a link, its hierarchical neighbors or peer related modules are again aware of a link connection or a link establishment.

In various embodiments, once a crashed service, component or module has been restarted, it may be out of sync with both its peers, and with its upper and lower layers of software. Furthermore, based on the criticality of this service as determined by the amount of information it contained, by the functionality it offers, or by merely its position in the hierarchy, such a crash or loss could be perceived as a panic situation by the mobile computing device in some embodiments. In various embodiments, instead of asking its lower layers to go to default states or asking them to reset their state machines or to simply restart, the HEMSTY protocol may request lower layer services and peers to "help" the crashed component or module to quickly resynchronize with the current state of events, however critical or minor they may be, thus maintaining system robustness. HEMSTY may be operative to arrest any chain reactions from spreading through a chain or hierarchy of modules, and instead localizes recovery primarily between two entities: the HEMSTY requester module and the HEMSTY provider module.

In some embodiments, the HEMSTY logic may be operative to recognize two constraints of particular importance to wirelessly connected devices with user inputs. For example, the HEMSTY logic may preserve a non-disruptive voice or data session with the network as long as the physical voice and data channels were acquired at one end of the spectrum, and, preserve the notion of continuity to the user, in terms of what they perceive and how the system behaves to their inputs at the time of the crash and recovery. HEMSTY logic may also be operative to address multiple crashes of software services, either during or around the time one service crashed in some embodiments. Other embodiments are described and claimed.

In some embodiments, the HEMSTY resynchronization logic 105, 107, 109 and 111 may be operative to delay the resynchronization of a module that has crashed based on a detection of a critical event. As recited above, HEMSTY may be operative to quickly resynchronize a crashed process, component or module with its providers and peers. HEMSTY may also be operative to maintain voice and data as well as to respond quickly to user requests during a crash and recovery in some embodiments.

In various embodiments, wireless data connections are maintained if, at the lowest level, the Telephony Host Stack is a HEMSTY requester module and if the Radio Firmware is a HEMSTY provider module. This may ensure, for example, that the Telephony Host Stack never asks the radio firmware to reset or go into default states. In some embodiments, to maintain a user's perception of responsiveness of the system, certain events may be allowed even while a HEMSTY recovery procedure is underway. As a result, in various embodiments, a critical events buffer may need to be maintained by the HEMSTY requester module and also by the HEMSTY provider module.

The critical event buffers may be categorized for a few events, for example. In some embodiments, an incoming call from the network, a call disconnect request sent by the user or a data connection request, such as a request for a new web page in a browser application, may comprise critical events. A critical event may comprise any sending or receiving of data over the wireless data connection in some embodiments. Other embodiments are described and claimed.

In some embodiments, a HEMSTY provider module may be operative to monitor LINK_LOST and LINK_UP events that indicate that a HEMSTY requester module crashed and restarted. During these two events, a HEMSTY provider module may log any requests sent to it by the network that it deems to be critical events. In various embodiments, these events will be marked with a CRITICAL TAG. During the subsequent HEMSTY recovery procedure that initiates after LINK_UP, a HEMSTY requester module may receive and parse the TAG of a HEMSTY notification. If, for example, the TAG is CRITICAL, then the HEMSTY requester module will immediately propagate that to its client, as it ultimately needs to be presented to the user.

In various embodiments, a similar procedure may take place at a parent of a HEMSTY requester module so that it too monitors for any critical user requests that are sent during LINK_LOST and LINK_UP events. For example, when the parent receives a HEMSTY_STARTED notification from the HEMSTY requester module, it will propagate the user request to the HEMSTY provider module before getting the HEMSTY_ENDED notification. The HEMSTY protocol in the system may operate so quickly that CRITICAL Event Buffers may be avoided and may in fact not be necessary in some embodiments. Other embodiments are described and claimed.

Figure 1B:
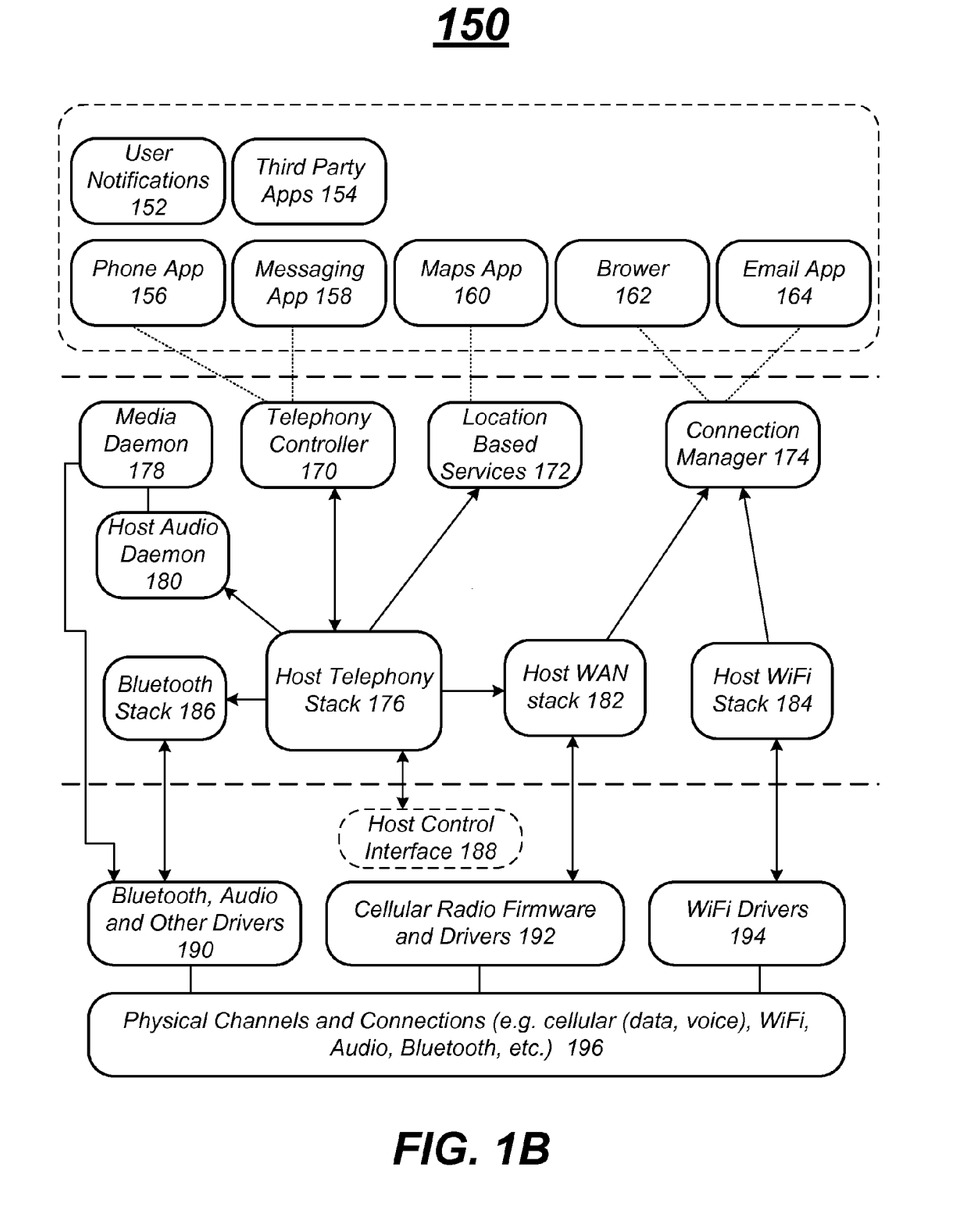
FIG. 1B illustrates one embodiment of a second mobile computing device.

The above described embodiments may be better understood by way of example. FIG. 1B illustrates a second mobile computing device 150 that may be the same or similar to mobile computing device 100 of FIG. 1A. In various embodiments, for purposes of illustration and not limitation, mobile computing device 150 may comprise a more detailed illustration of mobile computing device 100 capable of implementing a similar HEMSTY recovery and resynchronization procedure.

As shown in FIG. 1B, mobile computing device 150 includes user notifications 152, third party applications, 154, phone application 156, messaging application 158, maps application 160, browser 162, email application 164, telephony controller 170, location based services 172, connection manager 174, host telephony stack 176, media daemon 178, host audio daemon 180, host WAN stack 182, host WiFi stack 184, Bluetooth stack 186, host control interface 188, Bluetooth, audio and other drivers 190, cellular radio firmware and drivers 192, WiFi drivers 194 and physical channels and connections 192. It should be understood that a limited number and type of elements are shown in FIG. 1B for purposes of illustration and not limitation. Any number and type of component or element could be implanted in mobile computing device 150 and still fall within the described embodiments.

In various embodiments, the plurality of components/modules/elements of mobile computing device 150 may have an information dependent relationship with each other. For example, the components may include hierarchical or peer relationships that dictate the flow of communications through various layers of mobile computing device 150. In some embodiments, according to the above described HEMSTY protocol, the components of mobile computing device 150 would be classified as illustrated below in Table 1 for purpose of a HEMSTY recovery and resynchronization.

TABLE 1

| HEMSTY Requester Module | HEMSTY Provider Module |
| --- | --- |
| Host Telephony Stack (TIL) | Radio Firmware |
| Telephony Controller (Java) | Host Telephony Stack (TIL) |
| WAN Stack | TIL, Radio Firmware |
| Wifi Stack | Wifi Drivers |
| Connection Manager | WAN Stack, WiFi stack |
| Bluetooth Stack | TIL, Bluetooth Drivers |
| Audio Daemon | TIL, Bluetooth, others |
| Location Based Services Stack | TIL |
| WebOS Maps Application | Location Based Services Stack |
| WebOS Browser | Connection Manager |
| WebOS Data using third party app | Connection Manager |
| WebOS Phone App | Telephony Controller (Java) |
| WebOS SMS App | Telephony Controller (Java) |

As shown in Table 1, each component or module could be a potential HEMSTY requester module as well as a potential HEMSTY provider module, depending on whether it crashed, or its clients, peers or hierarchical neighbors crashed. Other embodiments are described and claimed.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagrams do not necessarily have to be executed in the order presented, unless otherwise indicated. In addition, the given logic diagrams may be implemented by a hardware element, a software element executed by a processor, or any combination thereof. The embodiments are not limited in this context.

The following primitives are helpful in describing the HEMSTY protocol in the foregoing and followings description. In some embodiments, LINK_DOWN may comprise an indication through software that the link between a potential HEMSTY requester and a potential HEMSTY provider has been broken or brought down, because the potential HEM- STY requester has crashed, for example. LINK_DOWN is detected, in various embodiments, by the potential HEMSTY Provider. LINK_UP may comprise an indication through software that the link between a potential HEMSTY requester and a potential HEMSTY provider has been restored in various embodiments. For example, this may occur when the system has brought up the HEMSTY requester (or the HEMSTY requester has restarted) and as its startup procedures has re-established the link between itself and the potential HEMSY provider. LINK_UP may be detected by the HEMSTY provider.

In various embodiments, a Client Stimuli Buffer may comprise a buffer maintained by a potential HEMSTY provider that contains the most recent set of events as information items that a potential HEMSTY requester will need in order to update its initial state to the current state as seen by the HEMSTY provider. A HEMSTY provider may contain multiple Client Stimuli Buffers, one per a HEMSTY Requester, where each of the buffers is tagged by a unique Requester Client ID in some embodiments. A Critical Event Buffer may comprise a buffer that a HEMSTY requester parent/peer or a HEMSTY provider may optionally fill if during LINK_DOWN and LINK_UP events, their own state machines receive events that are categorized as Critical in some embodiments. For example, an incoming call from a cellular network, or a call disconnect request from a user may comprise events that require immediate attention, even while in recovery. This may comprise an optional element in some embodiments because the speed of the recovery process may obviate this requirement in many systems.

A HEMSTY Request (Client ID) may comprise a first message that a HEMSTY requester sends to its HEMSTY provider(s), in order to ask them to help it synchronize to them in some embodiments. The HEMSTY requester provides its Client ID in the request and the requester sends a HEMSTY Request to all its potential HEMSTY providers.

In some embodiments, a HEMSTY Request Start (ACK) may comprise an acknowledgement that the HEMSTY requester receives from the Provider indicating that the Provider is ready to begin the HEMSTY recovery process for the requester. If there is a need to identify the HEMSTY provider, this message may also contain a Provider ID, for example. A HEMSTY Start Notification may comprise a notification that a HEMSTY requester sends to all its peers and parent(s) after it receives the (first) HEMSTY Request Start (ACK) from its HEMSTY provider(s) in various embodiments. This may comprise an indication to its parents and peers that it has crashed and come back and is now busy resynchronizing itself to current events. Depending on the query or notification model that exists between the requester and its parents/peers, this may be a forward notice to its neighbors to withhold any non critical requests including any potential HEMSTY requests that they may have had. Parents and peers may still pass Critical Events to the HEMSTY requester in some embodiments.

In various embodiments, a HEMSTY Recovery Procedure may comprise the phase where a HEMSTY provider will send up events (or respond to queries) in order to move the HEMSTY requester's state to the current state with respect to the HEMSTY provider. The set of events may be sent in the most natural order, that is, the way in which these events would have been sent if the HEMSTY requester had not crashed, for example. In some embodiments, if the set of information elements is large, a HEMSTY requester and provider may choose to transfer information elements in bulk to speed up the process. Other embodiments are described and claimed.

A HEMSTY Busy may comprise an error code that a HEMSTY requester will send back to its parents or peers who wish to communicate on Non-Critical items during the time HEMSTY recovery is taking place in some embodiments. This may help, for example, if a parent or a peer of the HEMSTY requester had received the HEMSTY Start Notification, and then crashed. This error code may help to synchronize a peer who wants to initiate HEMSTY with the requester, not knowing that the requester itself is undergoing a HEMSTY procedure. A HEMSTY requester will send HEMSTY Busy if it receives HEMSTY Requests during its own HEMSTY recovery procedure in various embodiments.

In some embodiments, a HEMSTY Request End may comprise a message sent by the HEMSTY provider to the HEMSTY requester to indicate that the HEMSTY Recovery Procedure has been completed. If a HEMSTY requester had multiple HEMSTY providers, for example, a collection of all such HEMSTY Request Ends would indicate the end of HEMSTY Recovery for the requester. In such a case, the HEMSTY Request End would also contain the Provider IDs (like the HEMSTY Request Start (ACK) would contain the Provider ID).

A HEMSTY End Notification may comprise a notification that a HEMSTY requester sends to all its peers and parent(s) after it receives the HEMSTY Request End from its provider(s) in some embodiments. This may be an indication to its parents and peers that it has now resynchronized itself with its provider and is effectively functional and back in the system. This may also be an indication to Parents and Peers to start or resume any HEMSTY request procedures that they may wish to initiate with the requester. With this notification, the requester indicates that it is ready to process commands and events, including its role as a HEMSTY provider if required.

In various embodiments, a HEMSTY Waiting may comprise a notification that a HEMSTY requester will send back to its parents and peers, whenever it receives a HEMSTY_BUSY as a response to the HEMSTY Request command that it sends to its HEMSTY provider. In some embodiments, this may useful for synchronizing its parents and peers, who themselves may need to stall their HEMSTY procedures with this HEMSTY requester. Other embodiments are described and claimed.

Figure 2A:
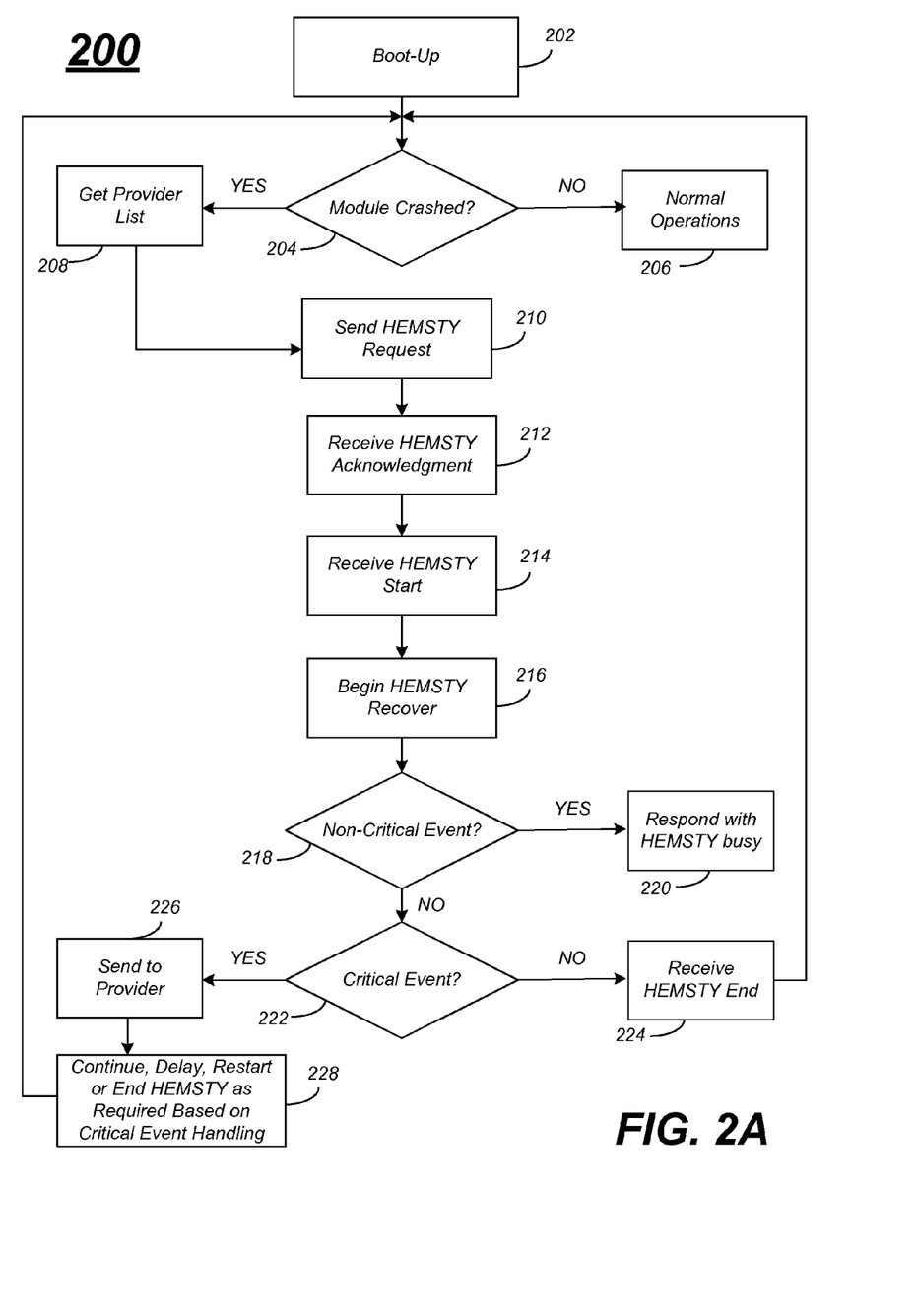
FIG. 2A illustrates one embodiment of a first logic diagram.

FIG. 2A illustrates a one embodiment of a first logic diagram. In particular, FIG. 2A illustrates a logic diagram 200, which may be representative of the operations executed by one or more embodiments described herein. FIG. 2A illustrates an embodiment of a HEMSTY recovery and resynchronization procedure for a mobile computing device, such as mobile computing device 100 or 150 for example, from the perspective of a HEMSTY requester module.

In various embodiments, a module may be booted up at 202. For example, mobile computing device 150 may be turned on and telephony controller 170 may be booted up or otherwise initiated or restarted to begin processing information. At 204, a determination is made at a module as to whether or not it has crashed. For example, telephony controller 170 of mobile computing device 150 may monitor itself to be aware if it has crash or not. If no crash is detected, normal operations continue at 206. If, on the other hand, a crash is detected the module is gets its provider list at 208. For example, if telephone controller 170 crashes, it may automatically get a list of all providers that may help it to resynchronize using the HEMSTY procedure.

After restarting from the crash, the module may send a HEMSTY request at 210 in some embodiments. For example, telephone controller 170 may send a HEMSTY resynchronization request to host telephony stack 176. At 212, the requester module may receive a HEMSTY acknowledgment response from a provider module. For example. telephone controller 170 may receive a HEMSTY acknowledgement message from host telephony stack 176.

In some embodiments, a HEMSTY start message may be received at the requester module at 214. For example, telephone controller 170 may receive a HEMSTY start message from host telephony stack 176 indicating that the HEMSTY recovery and resynchronization procedure has begun. At 216, in some embodiments, a begin HEMSTY recovery message may be received at the requester module. For example, telephone controller 170 may receive a message indicating the HEMSTY recovery is underway.

At 218, or at any other suitable point in the logic diagram, a determination may be made whether or not a non-critical event has been detected by the requester module. If yes, at 220 the requester module may respond with a HEMSTY busy message indicating that the non-critical event will not be handled at that time. At 222, or at any other suitable point in the logic diagram, a determination may be made whether or not a critical event has been detected at the requester module. If no, the HEMSTY process may complete and a HEMSTY end message may be received at 224. If yes, the critical event may be sent to a provider at 226. At 228, the HEMSTY procedure may be continued, delayed, restarted or ended as required based on the handling of the critical event and the status of the HEMSTY recovery and resynchronization. Other embodiments are described and claimed.

In various embodiments, the steps shown in FIG. 2A do not represent each and every possible step or portion of a HEMSTY process or logic flow. A person skilled in the art will understand that other steps may be implemented to handle or address any number of events that could possibly occur during a HEMSTY process. For example, HEMSTY may additionally include steps for handling multiple crashes. In some embodiments, in the case of multiple crashes of multiples modules or components, the most critical resource may recover first (based on a hierarchical level of the module or component, for example) so that accurate information flow can be resorted to the system.

In some embodiments, the HEMSTY requester module may additionally monitor and detect a LINK_LOST of its HEMSTY provider module. For example, a HEMSTY requester module may be in the midst of a HEMSTY recovery and may detect that its HEMSTY provider module has crashed. In this example, the HEMSTY requester module may monitor various timers and/or buffers (e.g. a critical events buffer, for example), to determine the appropriate next steps to continue, alter or otherwise adjust and complete the HEMSTY recovery process. In one embodiment, for example, a HEMSTY requester module may become the parent of a HEMSTY requester during its own HEMSTY if its provider crashes, which may require a HEMSTY_WAITING and an extension of the logic flow 200. Other embodiments are described and claimed.

Figure 2B:
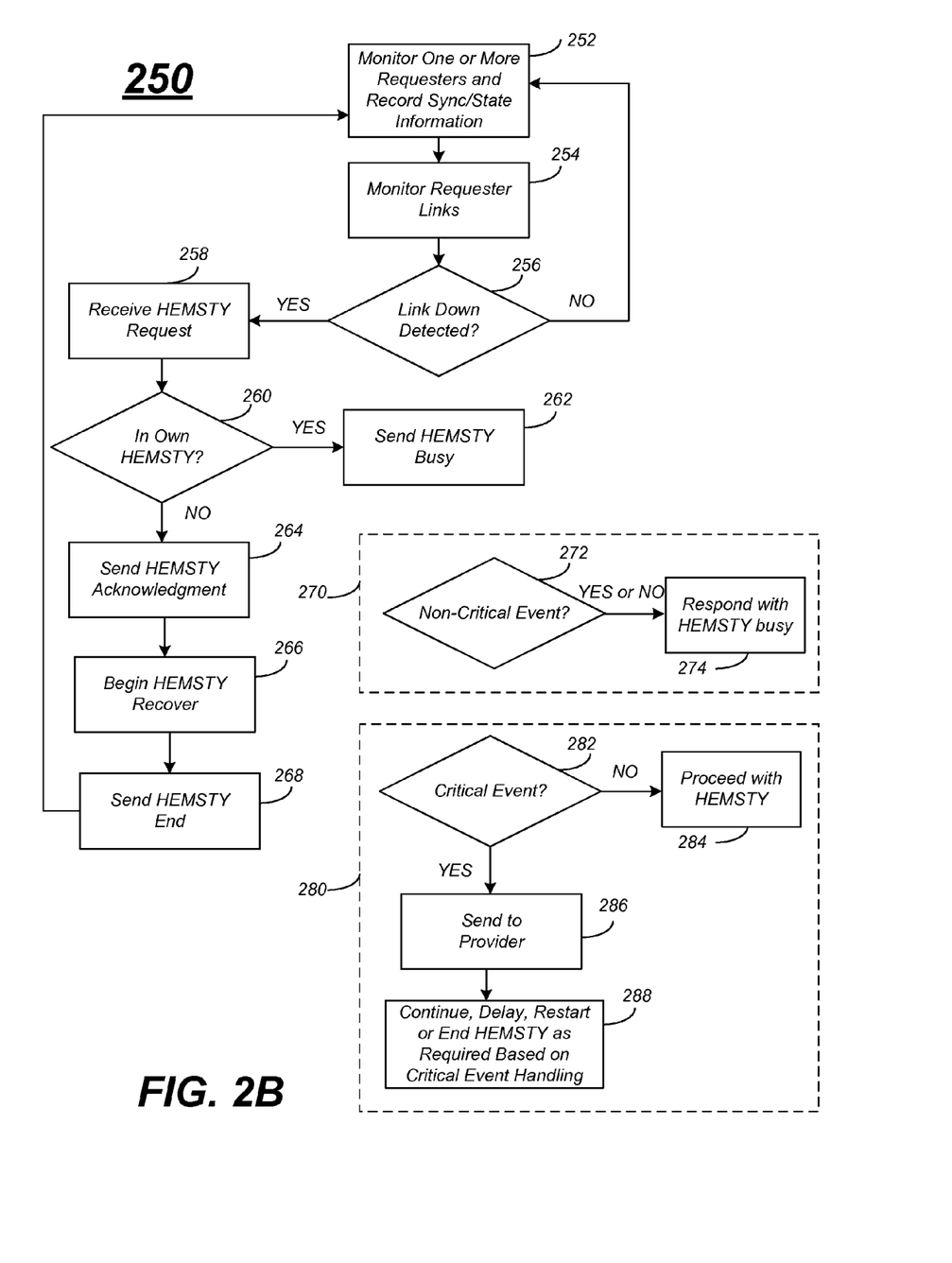
FIG. 2B illustrates one embodiment of a second logic diagram.

FIG. 2B illustrates one embodiment of a second logic diagram. In particular, FIG. 2B illustrates a logic diagram 250, which may be representative of the operations executed by one or more embodiments described herein. FIG. 2B illustrates an embodiment of a HEMSTY recovery and resynchronization procedure for a mobile computing device, such as mobile computing device 100 or 150 for example, from the perspective of a HEMSTY provider module.

As shown in the FIG. 2B, one or more requester modules may be monitored and their synchronization and/or state information may be recorded at 252. For example, host telephony stack 176 may monitor telephony controller 170, location based services 172, host WAN stack 182, Bluetooth stack 186 and host audio daemon 180 and may record synchronization and/or state information for each of these potential requester modules.

At 254, the provider module may monitor requester links. At 256, a determination is made whether or not a link down has been detected. For example, host telephony stack 176 may monitor the links associated with each of its potential requester modules and determine if any of these links are down. If no links are down, monitoring and recording of potential requester modules may continue. If a link down is detected, a HEMSTY request is received at 258. For example, if the telephony controller 170 were to crash, host telephony stack 176 may receive a HEMSTY request after the telephony controller 170 has restarted.

In various embodiments, a determination is made at 260 whether or not the provider modules is involved in its own HEMSTY procedure. If yes, at 262 a HEMSTY busy message is sent to the requester module. For example, if the host telephony stack 176 has crashed, and the telephony controller 170 has sent a HEMSTY requester to the host telephony stack 176, the host telephony stack may respond with a HEMSTY busy message because it will not, at that time, be able to assist the telephony controller with its HEMSTY resynchronization. In various embodiments, this is done to ensure that the most critical service (e.g. one being on the lower layer of the hierarchy) recovery first before it is able to assist any of its potential HEMSTY requester modules.

If the provider module is not in its own HEMSTY, a HEMSTY acknowledgement message is sent at 264. For example, host telephony stack 176 may send a HEMSTY acknowledgement message to telephony controller 170 in response to the received request from telephony controller 170. In some embodiments, the HEMSTY recovery is begun at 266 and, after completion of the resynchronization, a HEMSTY end message may be sent at 268.

In various embodiments, as shown at 270 and 280, monitoring for non-critical and critical events may also take place at any appropriate point in each provider module. As shown, whether or not a non-critical event is detected at 272, a HEMSTY busy message may be sent at 274. If no critical event is detected at 282, the HEMSTY procedure may continue. If, on the other hand, a critical event is detected at 282, the critical event may be sent to a provider for that event or for the provider module and the HEMSTY procedure may be continued, delayed, restarted or completed and ended as required based on the critical event handling and the status of the HEMSTY recovery and resynchronization.

In various embodiments, the steps shown in FIG. 2B do not represent each and every possible step or portion of a HEMSTY process or logic flow. A person skilled in the art will understand that other steps may be implemented to handle or address any number of events that could possibly occur during a HEMSTY process. Other embodiments are described and claimed.

Figure 3:
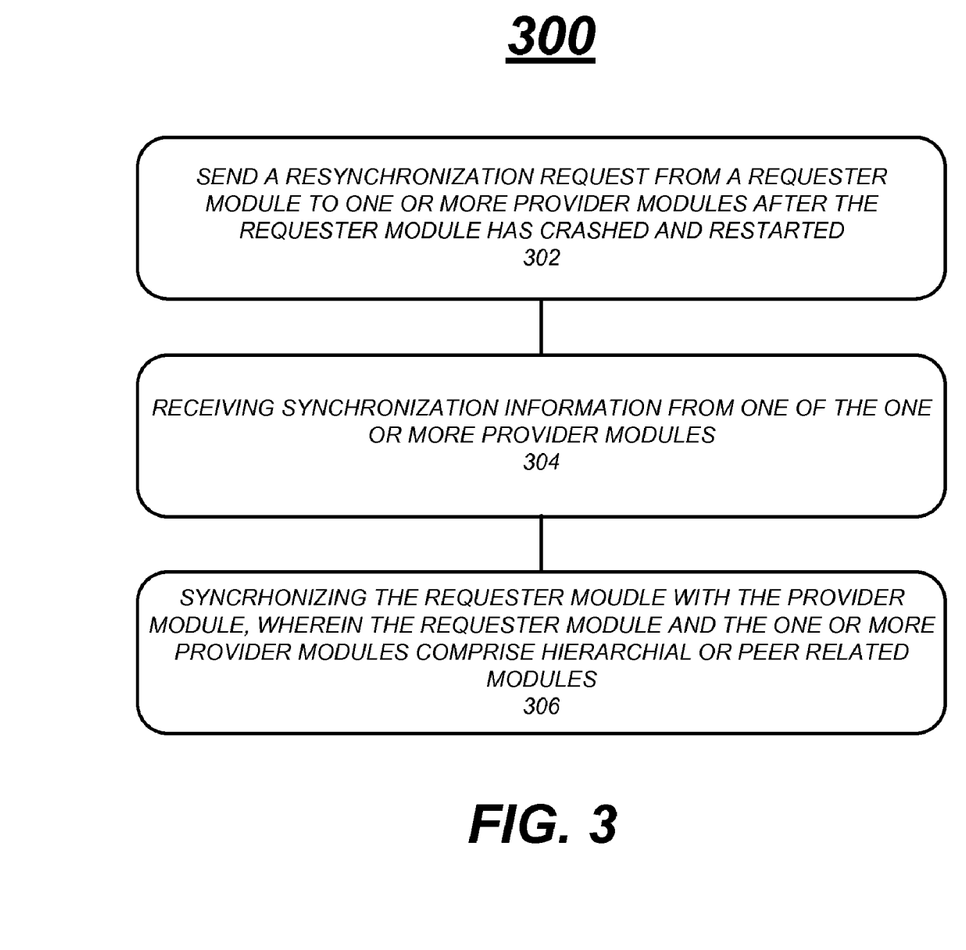
FIG. 3 illustrates one embodiment of third logic diagram.

FIG. 3 illustrates one embodiment of a third logic diagram. In particular, FIG. 3 illustrates a logic diagram 300, which may be representative of the operations executed by one or more embodiments described herein. As shown in FIG. 3, a resynchronization request may be sent from a requester module to one or more provider modules after the requester module has crashed and restarted at 302. For example, telephony controller 170 may crash and send a resynchronization request to host telephony stack 176 after it has restarted. In some embodiments, the requester module may automatically restart after the crash. The resynchronization request may include identification information for the requester module, for example.

In various embodiments, synchronization information may be received from one of the one or more provider modules by the requester module at 304. For example, telephony controller 170 may receive synchronization information from host telephony stack 176. In some embodiments, synchronization information for one or more requester module may be monitored at each provider module, wherein the synchronization information comprises one or more information elements comprising a recent state of a requester module. A buffer may be managed at each provider module in some embodiments, wherein the buffer may include synchronization information for each requester module monitored by the provider module. In various embodiments, the information from the buffer may be provided as the synchronization information to the requester module.

At 306, the requester module may be synchronized with the provider module. A wireless connection may be maintained after the crash and during the resynchronization of the requester module in some embodiments. For example, if the telephony controller 170 were to crash, the remaining components of mobile computing device 150 may cooperate to maintain the wireless connection for the device.

In various embodiments, a critical event may be detected during the resynchronization of the requester module, the critical event may be addressed using modules other than the requester module or may be passed on by the requester and provider modules as necessary to handle the critical event, and the resynchronization request may be resent to the one or more provider modules after the critical event has been addressed, if necessary. In some embodiments, the critical events may comprise one or more of receiving an incoming telephone call, receiving a request to disconnect a telephone call or receiving a request to wirelessly upload or download data over a wireless connection. A non-critical event may be detected during the resynchronization of the requester module in some embodiments, and a resynchronization busy message may be sent to a sender of the non-critical event. Other embodiments are described and claimed.

Figure 4:
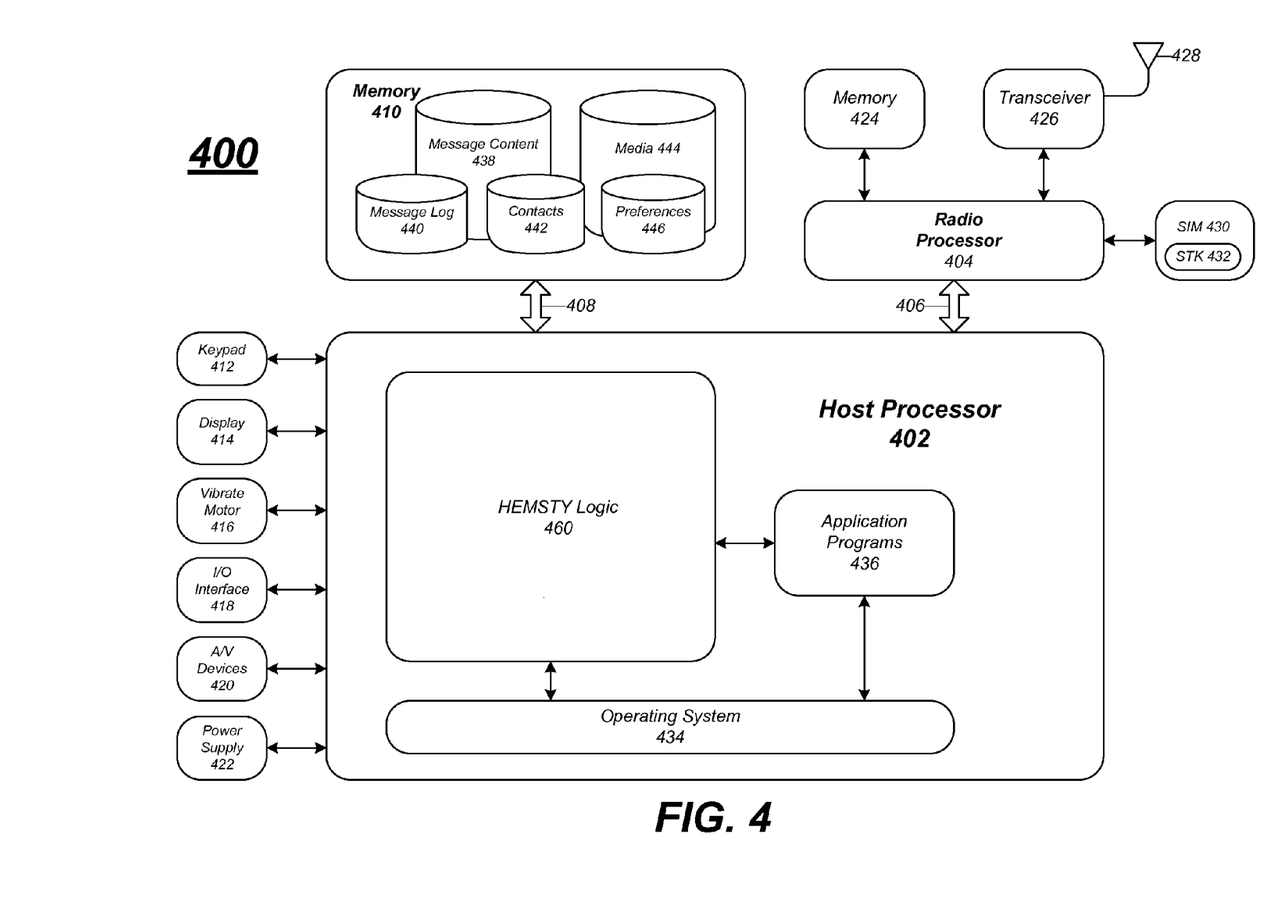
FIG. 4 illustrates one embodiment of a third mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various wireless data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor. In various embodiments, the radio processor 404 may be operative to implement dual modes of technology (e.g. both CDMA and UMTS, for example).

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alpha-numeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen.

The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth, similar to transceivers/switching technologies 108-1-$n$ of FIG. 1. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals, similar to antennas 110-1-$m$ of FIG. 1. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a webOS™, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Runtime Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include HEMSTY logic 460. The HEMSTY logic 460 may the same or similar to the HEMSTY logic described with reference to FIGS. 1A, 1B, 2A, 2B and 3.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
a processor; and
a plurality of hierarchical or peer related modules for execution by the processor, each of the plurality of modules including resynchronization logic operative to resynchronize a module after the module enters a non-operative state using a neighboring hierarchical or peer related module.

2. The mobile computing device of claim 1, wherein the plurality of modules are operative to manage a wireless connection for the mobile computing device.

3. The mobile computing device of claim 2, wherein the wireless connection is maintained when a module enters a non-operative state and during the resynchronization of the module that entered the non-operative state.

4. The mobile computing device of claim 1, wherein the module that entered the non-operative state comprises a requester module and one or more neighboring hierarchical or peer related modules comprise provider modules.

5. The mobile computing device of claim 4, wherein the requester module is operative to automatically recover after entering the non-operative state and to request synchronization information from one or more neighboring hierarchical or peer related modules.

6. The mobile computing device of claim 5, wherein each provider module includes a buffer having synchronization information for one or more requester modules, a provider module to provide the synchronization information in response to the request from the requester module.

7. The mobile computing device of claim 6, wherein the requester module receives the synchronization information from the provider module and resynchronizes to the provider module using the synchronization information.

8. The mobile computing device of claim 7, wherein the synchronization information comprises one or more information elements comprising a recent state of a requester module as monitored by one or more provider modules.

9. The mobile computing device of claim 1, wherein the resynchronization logic is operative to delay the resynchronization of a module that has entered a non-operative state based on a detection of a critical event or to pass information relating to the critical event to a neighboring hierarchical or peer related module.

10. The mobile computing device of claim 1, the plurality of modules comprising a software stack coupled by a bus.

11. A computer-implemented method, comprising:
sending a resynchronization request from a requester module to one or more provider modules after the requester module has entered a non-operative state and restarted;
receiving synchronization information from one of the one or more provider modules; and
synchronizing the requester module with the provider module, wherein the requester module and the one or more provider modules comprise hierarchical or peer related modules.

12. The method of claim 11, comprising:
automatically restarting the requester module after entering the non-operative state.

13. The method of claim 11, comprising:
maintaining a wireless connection after a requester module enters a non-operative state and during the resynchronization of the requester module.

14. The method of claim 11, comprising:
detecting a critical event during the resynchronization of the requester module;
addressing the critical event using modules other than the requester module; and
resending the resynchronization request to the one or more provider modules after the critical event has been addressed.

15. The method of claim 14, wherein critical events comprise one or more of receiving an incoming telephone call, receiving a request to disconnect a telephone call or receiving a request to wirelessly upload or download data over a wireless connection.

16. The method of claim 11, comprising:
detecting a non-critical event during the resynchronization of the requester module; and
sending a resynchronization busy message to a sender of the non-critical event.

17. The method of claim 11, wherein the resynchronization request includes identification information for the requester module.

18. The method of claim 11, comprising:
monitoring synchronization information for one or more requester module at each provider module, wherein the synchronization information comprises one or more information elements comprising a recent state of a requester module.

19. The method of claim 18, comprising:
managing a buffer at each provider module, the buffer including synchronization information for each requester module monitored by the provider module.

20. An article comprising a non-transitory computer-readable storage medium containing instructions that, when executed by a processo, enable a system to:
send a resynchronization request from a requester module to one or more provider modules after the requester module has entered a non-operative state and restarted;
receive synchronization information from one of the one or more provider modules; and
synchronize the requester module with the provider module, wherein the requester module and the one or more provider modules comprise hierarchical or peer related modules.

21. The article of claim 20, comprising instructions that, when executed by the processor, enable the system to:
automatically restart the requester module after entering the non-operative state.

22. The article of claim 20, comprising instructions that, when executed by the processor, enable the system to:
maintain a wireless connection when the requester module is in the non-operative state and during the resynchronization of the requester module.

23. The article of claim 20, comprising instructions that, when executed by the processor, enable the system to:
detect a critical event during the resynchronization of the requester module;
address the critical event using modules other than the requester module; and
resend the resynchronization request to the one or more provider modules after the critical event has been addressed.

24. The article of claim 20, comprising instructions that, when executed by the processor, enable the system to:
detect a non-critical event during the resynchronization of the requester module; and
send a resynchronization busy message to a sender of the non-critical event.

25. The article of claim 20, wherein the resynchronization request includes identification information for the requester module.

26. The article of claim 20, comprising instructions that, when executed by the processor, enable the system to:
monitor synchronization information for one or more requester module at each provider module, wherein the synchronization information comprises one or more information elements comprising a recent state of a requester module.

27. The article of claim 20, comprising instructions that, when executed by the processor, enable the system to:
manage a buffer at each provider module, the buffer including synchronization information for each requester module monitored by the provider module.

* * * * *

UNITED STATES PATENT AND TRADEMARK OFFICE
CERTIFICATE OF CORRECTION

PATENT NO. : 8,392,750 B2
APPLICATION NO. : 12/706537
DATED : March 5, 2013
INVENTOR(S) : Anupam Kaul Page 1 of 1

It is certified that error appears in the above-identified patent and that said Letters Patent is hereby corrected as shown below:

In the Claims:

In column 22, line 18, in Claim 20, delete "processo," and insert -- processor, --, therefor.

Signed and Sealed this
Third Day of September, 2013

Teresa Stanek Rea
*Acting Director of the United States Patent and Trademark Office*